US007521880B2

(12) United States Patent
Kobayashi

(10) Patent No.: US 7,521,880 B2
(45) Date of Patent: Apr. 21, 2009

(54) RECORDING APPARATUS

(75) Inventor: Isao Kobayashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 298 days.

(21) Appl. No.: 11/456,032

(22) Filed: Jul. 6, 2006

(65) Prior Publication Data

US 2007/0007915 A1 Jan. 11, 2007

(30) Foreign Application Priority Data

Jul. 6, 2005 (JP) ............................ 2005-197321

(51) Int. Cl.
*H02P 1/54* (2006.01)

(52) U.S. Cl. ............................... 318/53; 318/34; 318/5

(58) Field of Classification Search ...................... None
See application file for complete search history.

(56) References Cited

U.S. PATENT DOCUMENTS 4,361,787 A * 11/1982 Negishi et al. ................. 318/6
4,405,883 A * 9/1983 Ashida .......................... 318/6
6,209,984 B1 * 4/2001 Kim ............................ 347/37
6,587,038 B2 * 7/2003 Cheng et al. ............. 340/384.1
2005/0116977 A1 * 6/2005 Shinkawa et al. ............. 347/14
2005/0122360 A1 * 6/2005 Sakagami et al. ............. 347/19
2005/0128232 A1 * 6/2005 Shinkawa .................... 347/10

FOREIGN PATENT DOCUMENTS

JP 2000158643 6/2000

* cited by examiner

*Primary Examiner*—Walter Benson
*Assistant Examiner*—Renata McCloud
(74) *Attorney, Agent, or Firm*—Baker Botts L.L.P.

(57) ABSTRACT

A recording apparatus including: (a) a recording head unit for performing a dot recording operation by activation of the actuators; (b) a main circuit for outputting a plurality of sets of drive waveform signals; and (c) a head driver unit for receiving the sets of drive waveform signals outputted from the main circuit, generating a drive signal based on one of the drive waveform signals that is selected from among each of the received sets of drive waveform signals, and supplying the generated drive signal to each actuator of the recording head. The main circuit transmits a single set of waveform data signals containing data representative of the plurality of sets of drive waveform signals, to the head driver unit. The head driver unit includes a waveform signal retriever operable to retrieve the plurality of sets of drive waveform signals from the single set of waveform data signals, with reference to reference signals, so that the head driver unit receives the plurality of sets of drive waveform signals.

13 Claims, 9 Drawing Sheets

RECORDING APPARATUS

This application is based on Japanese Patent Application No. 2005-197321 filed on Jul. 6, 2005, the content of which is incorporated hereinto by reference.

BACKGROUND OF THE INVENTION

1. Field of the Invention

The present invention relates to a recording apparatus, for example, of inkjet type.

2. Discussion of Related Art

As a kind of recording apparatus, there is known an inkjet type recording apparatus for performing a recording operation. During the recording operation, an inkjet head unit is caused to eject recording materials (ink droplets) toward a recording medium, while a carriage carrying the head unit is moved such that the head unit is moved relative to the recording medium with a predetermined spacing distance therebetween being maintained.

As such an inkjet type recording apparatus, there is a recording apparatus in which a head driver unit mounted on the carriage is arranged to receive various data signals such as drive data signals (recording data signals) and drive waveform signals that are outputted from a main circuit disposed in a stationary main body of the apparatus. The inkjet head unit (hereinafter referred to as "recording head unit") is operated by the head driver unit, so as to eject the ink droplets through a plurality of nozzles formed in the head unit.

In the inkjet type recording apparatus, for performing a recording operation with gradation control, a plurality of drive waveform signals having respective different drive waveforms have to be available so that the recording material can be ejected as an ink droplet that is variable in its size. Further, for reducing a peak value of electric power consumed by the recording head unit and for avoiding a so-called "cross talk" between adjacent ink chambers of the recording head unit, the drive waveform signals supplied for ink ejections through respective nozzles arranged in each region or row have to be variable so as to be different from each other. Further, where a color recording operation is performed by using a plurality of different recording materials, there is a requirement of recording with the drive waveform signals having respective waveforms suitable for characteristics of the respective color inks. Consequently, the required number of kinds of drive waveform signals are increased for satisfying the above requirements. The increase in the number of kinds of drive waveform signals leads to increase in the number of signal wires required for supplying the drive waveform signals to the drive circuits of the head driver unit.

The increase of the number of the signal wires is disadvantageous in view of cost and maintenance performance. Particularly, where a flexible flat cable is used for transmitting the signals from the main circuit disposed in the stationary main body to the head driver unit carried by the carriage, the flexible flat wire has a width inevitably increased by the increased number of the signal wires, thereby necessitating a complicated disposition of the flexible flat cable and even increasing a load exerted on the carriage moved relative to the stationary main body.

In view of the above-described problems, there have been made various attempts to reduce the number of the signal wires for transmitting the drive waveform signals from the main circuit to the head driver unit. For example, there was proposed an arrangement, as disclosed in JP-2000-158643A, in which waveform-related data (e.g., data representative of pulse width) required for generation of drive waveform signals are serially transmitted to each of drive-waveform-signal generator circuits disposed in the recording head unit prior to a recording operation, and the drive waveform signals are generated based on the waveform-related data by the drive-waveform-signal generator circuits upon initiation of the recording operation.

In the above-described proposed arrangement, the number of the signal wires for transmitting the drive waveform signals from the main circuit to the head driver unit can be made smaller than in the conventional arrangement. However, the plurality of drive-waveform-signal generator circuits as extra components are required for the generations of the respective different drive waveform signals, whereby the recording head unit is inevitably increased in weight.

SUMMARY OF THE INVENTION

The present invention was made in view of the background prior art discussed above. It is therefore an object of the invention to provide a recording apparatus having an arrangement for making it possible to reduce the number of the signal wires used for transmitting the drive waveform signals from the main circuit to the head driver unit, without employing extra components such as drive-waveform-signal generator circuits.

This object may be achieved by the present invention providing a recording apparatus including: (a) a recording head unit having a plurality of actuators and operable to perform a dot recording operation using a plurality of recording materials that are ejected by activation of the actuators; (b) a main circuit operable to output a plurality of sets of drive waveform signals for controlling ejection of the recording materials, each of the plurality of sets including a plurality of drive waveform signals having respective waveforms different from each other; and (c) a head driver unit operable to receive the plurality of sets of drive waveform signals outputted from the main circuit, generate a drive signal based on one of the drive waveform signals that is selected from among each of the received sets of drive waveform signals, and supply the generated drive signal to each of the plurality of actuators. The main circuit supplies the plurality of sets of drive waveform signals to the head driver unit, by transmitting a single set of waveform data signals containing data representative of the plurality of sets of drive waveform signals, to the head driver unit. The main circuit transmits, in addition to the single set of waveform data signals, a plurality of reference signals to the head, driver unit. The head driver unit includes a waveform signal retriever operable to retrieve the plurality of sets of drive waveform signals from the single set of waveform data signals, with reference to the reference signals, so that the head driver unit receives the plurality of sets of drive waveform signals.

In the recording apparatus according to the invention, the single set of waveform data signals containing data representative of the plurality of sets of drive waveform signals is transmitted from the main circuit to the head driver unit. The waveform signal retriever of the head driver unit is operated to retrieve the plurality of sets of drive waveform signals from the single set of waveform data signals, with reference to the reference signals that are transmitted, together with the single set of waveform data signals, from the main circuit to the head driver unit. Since the plurality of sets of drive waveform signals are supplied as the single set of waveform data signals to the head driver unit, it is possible to reduce the number of signal wires that are required for supplying the plurality of sets of drive waveform signals.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Referring first to FIGS. 1-5, there will be described a recording apparatus constructed according to an embodiment of the invention. This recording apparatus is of a known inkjet type, and includes a carriage reciprocatively movable along a recording medium, and a recoding head unit mounted on the carriage and operable to eject ink droplets toward the recording medium.

Figure 1:
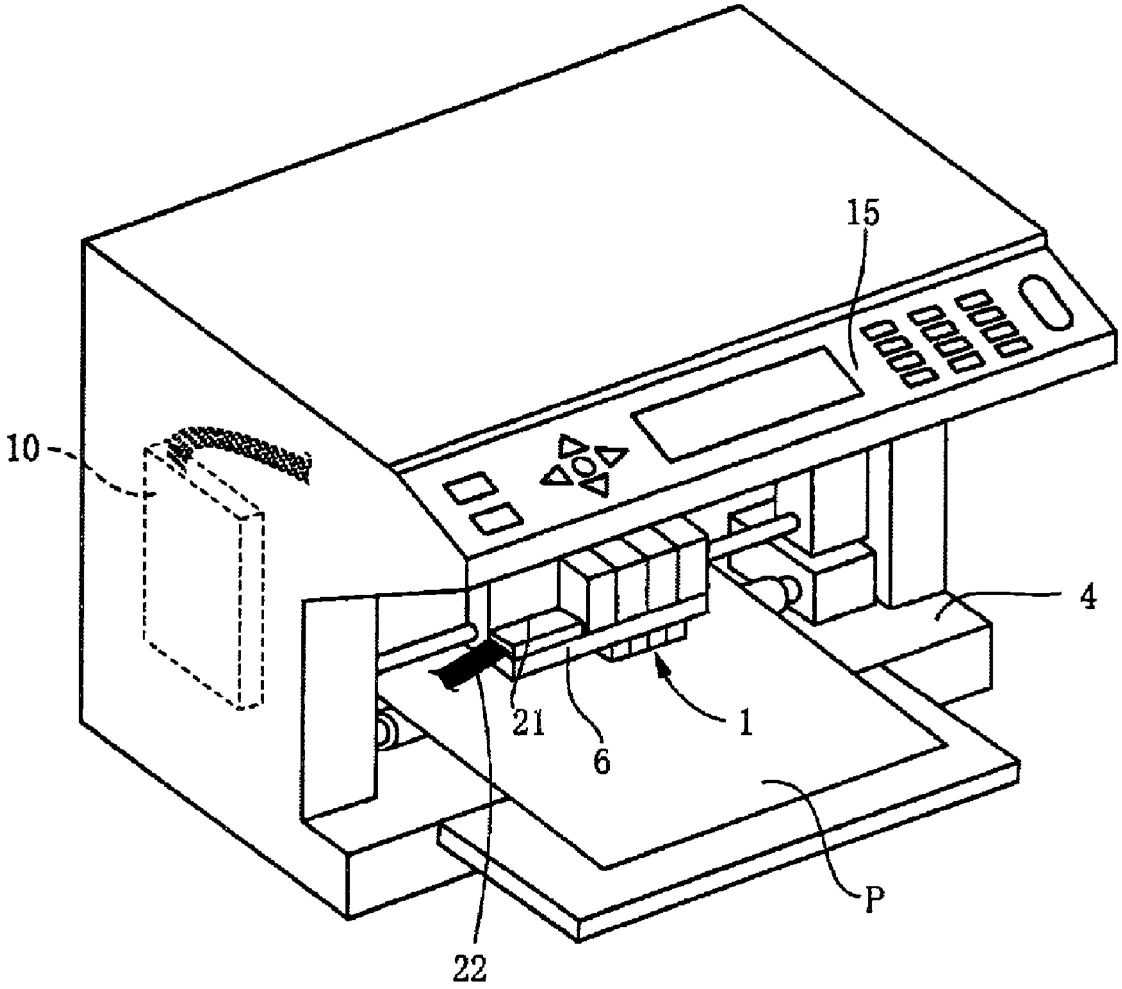
FIG. 1 is a perspective view of an inkjet-type recording apparatus constructed according to an embodiment of the invention.
Figure 2:
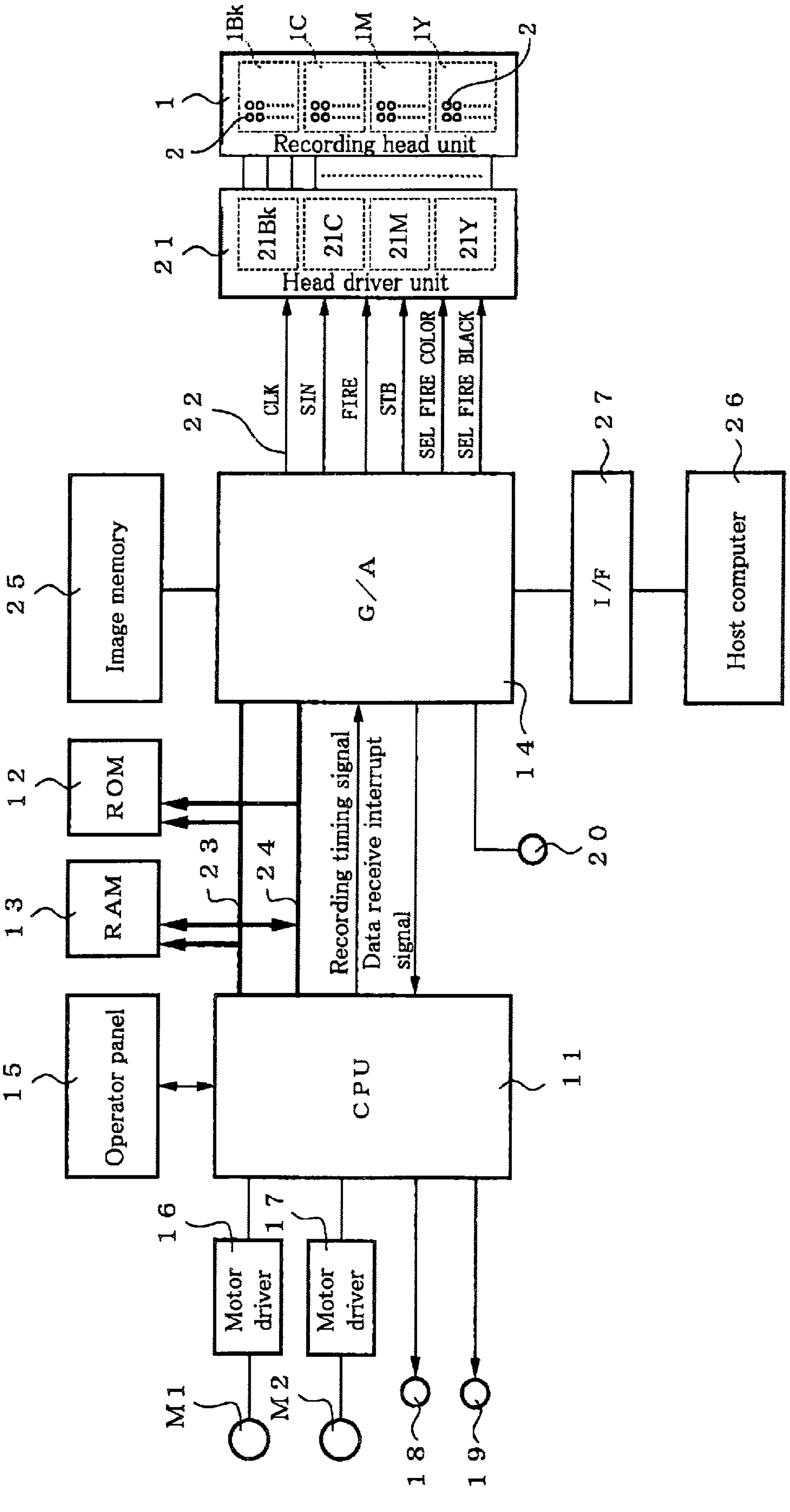
FIG. 2 is a block diagram showing an electrical arrangement in the recording apparatus of FIG. 1.

As shown in FIGS. 1 and 2, the recording apparatus has a controller principally constituted by a main circuit 10 that includes: CPU 11 for processing drive data signals (print data signals) and controlling operation of the recording apparatus; ROM 12 for storing programs executed by the CPU 11; RAM 13 for temporarily storing data during processing of the data signals by the CPU 11; and a gate array (G/A) 14 provided by a gate circuit LSI. To the CPU 11, there are connected: an operator panel 15 through which the user enters desired commands (e.g., printing command) into the CPU 11; a motor driver 16 for driving a carriage motor M1 (for reciprocatively moving the carriage 6 relative to a stationary main body 4 of the recording apparatus); a motor driver 17 for driving a paper feed motor M2 (for feeding the recording medium in the form of a recording paper sheet P in a predetermined direction); a paper presence sensor 18 for detecting a leading edge of the paper sheet; and a home position sensor 19 for confirming that the carriage 6 carrying a recording head unit 1 is positioned in its home position when it is returned to the home position.

The recording head unit 1 includes four recording heads 1Bk, 1C, 1M, 1Y as recording portions that are respectively operable to eject black, cyan, magenta and yellow inks as a plurality of recording materials. The recording head unit 1 is driven by a head driver unit 21 that is mounted together with the recording head unit 1 on the carriage 6. The head driver unit 21 and the gate array 14 are connected through a flexible flat cable 22 (harness cable), so that the head driver unit 21 is movable together with the carriage 6 while being controlled by the gate array 14.

Although not being specifically illustrated in the drawings, each of the recording heads 1Bk, 1C, 1M, 1Y of the recording head unit 1 has a plurality of actuators 2 each of which is provided by a piezoelectric element and an electrostriction element, a plurality of ink chambers (not shown) storing therein the inks, and a plurality of nozzles (not shown) held in communication with the respective ink chambers. The volumes of the respective ink chambers are changed (increased and reduced) independently of each other, by activations of the respective actuators 2. Thus, the ink in the form of an ink droplet is ejected through each nozzle when the volume of the corresponding ink chamber is changed. The actuators 2 are activated by the head driver unit 21 that is connected to electrodes provided in the recording head unit 1. The head driver unit 21 is controlled by the gate array 14 to generate a drive signal having a waveform suitable for the recording head unit 1 and apply the generated drive signal to each of the electrodes. To the gate array 14, there is connected an encoder 20 that is arranged to detect a position of the carriage 6.

The CPU 11 is connected to the ROM 12, RAM 13 and gate array 14 via an address bus 23 and a data bus 24. The CPU 11 generates a recording timing signal and a reset signal in accordance with the programs prestored in the ROM 12, and transmits the signals to the gate array 14. A plurality of drive waveform signal sets are prestored in the ROM 12, or are transmitted together with the drive data signals from a host computer (personal computer) 26 via an interface 27 to the RAM 13 or an image memory 27 so as to be stored in the RAM 13 or image memory 27. The drive waveform signal sets stored in the ROM 12, RAM 13 or image memory 27 are supplied to the gate array 14, in a recording operation.

The gate array 14 receives an image data transmitted from the host computer 26 as an external device via the interface 27, and supplies the image data to the image memory 25 so that the image data is temporarily stored in the image memory 25. Further, the gate array 14 generates a data receive interrupt signal, based on the drive data signals transmitted from the host computer 26 via the interface 27, and supplies the data receive interrupt signal to the CPU 11.

The gate array 14 generates a clock signal CLK and a strobe control signal STB, based on the recording timing signal and control signals supplied from the encoder 20, and generates drive data signals SIN_0, SIN_1, SIN_2 (for forming the image data on the recording medium), based on the image data temporarily stored in the image memory 25. The gate array 14 transmits the generated drive data signals SIN_0, SIN_1, SIN_2 in synchronization with the clock signal CLK, to the head driver unit 21. Further, the gate array 14 transmits, in response to the recording timing signals and the control signals supplied from the encoder 20, a plurality of drive waveform signal sets (e.g., a waveform signal set for controlling ejection of the black ink and another waveform signal set for controlling ejection of a non-black ink), in synchronization with the clock signal CLK, to the head driver unit 21. In this instance, the plurality of drive waveform signal sets are transmitted as a single set of waveform data signals FIRE 01~06 (into which the drive waveform signal sets are merged), together with a plurality of reference signals SEL FIRE BLACK, SEL FIRE COLOR. The transmissions of the signals from the gate array 14 to the head driver unit 21 are made through the flexible flat cable 22 that connects the gate array 14 and the head driver unit 21.

Figure 3:
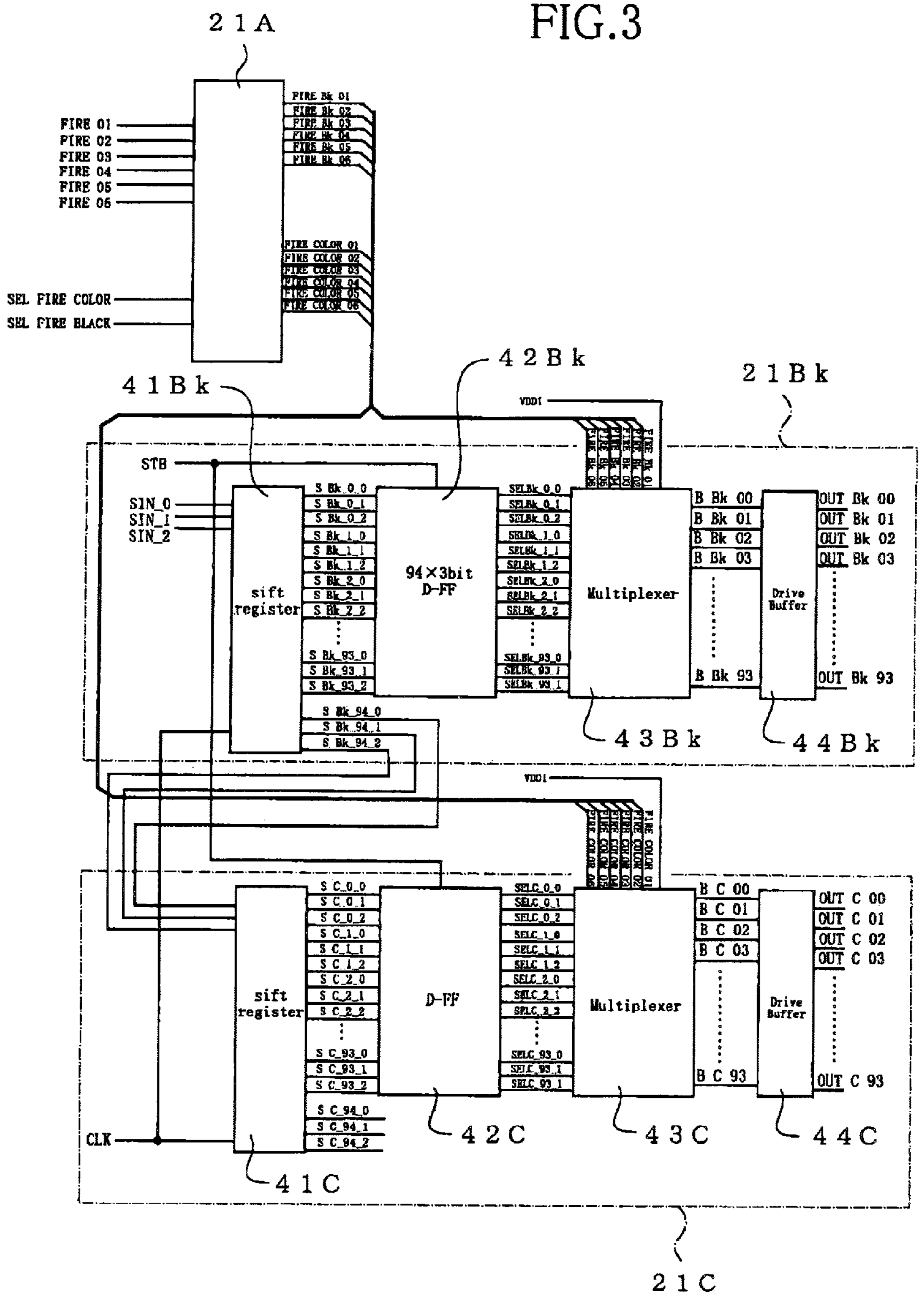
FIG. 3 is a block diagram showing a head driver unit of the recording apparatus of FIG. 1.

The head driver unit 21 has a waveform signal retriever 21A operable to retrieve the plurality of drive waveform signal sets from the single set of waveform data signals FIRE 01~06, with reference to the reference signals SEL FIRE BLACK, SEL FIRE COLOR, as shown in FIG. 3. The head driver unit 21 further has drive circuits 21Bk, 21C, 21M, 21Y, as shown in FIG. 2. The recording heads 1Bk, 1C, 1M, 1Y are driven by the respective drive circuits 21Bk, 21C, 21M, 21Y, for ejecting the respective black, cyan, magenta and yellow inks. Since the drive circuits 21C, 21M, 21Y are substantially identical in construction with each other, only the drive circuit 21C will be described as one of the drive circuits, and redundant description of the drive circuits 21M, 21Y will not be provided.

Figure 4:
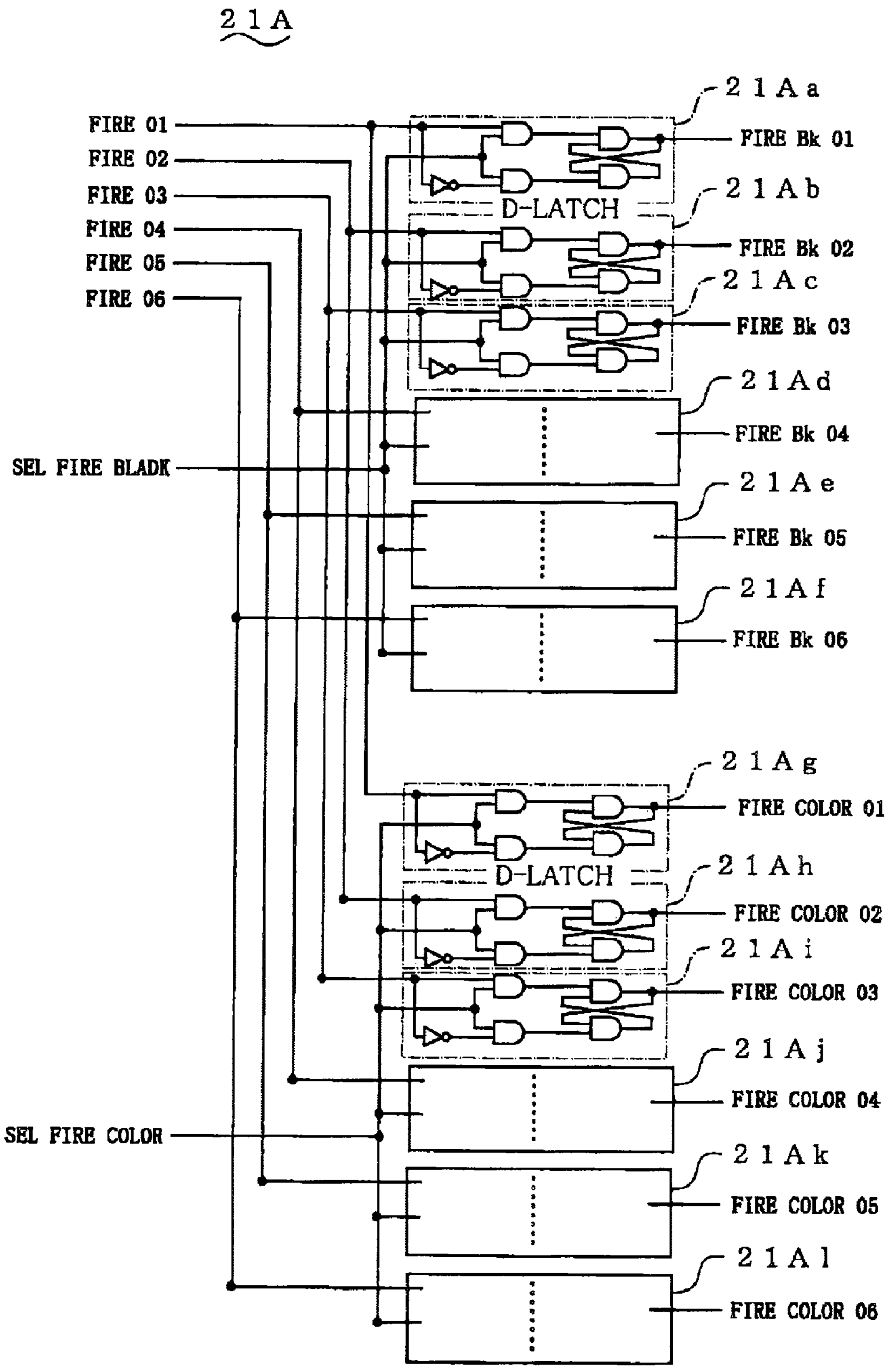
FIG. 4 is a view showing a waveform signal retriever of the head driver unit shown in FIG. 3.

As shown in FIG. 4, the waveform signal retriever 21A has a plurality sets of converter elements in the form of two sets of D latch circuits 21Aa-Al each having two input terminals. One of the two sets of D latch circuits 21Aa, 21Ab, 21Ac, 21Ad, 21Ae, 21Af are provided to output the respective drive waveform signals FIRE Bk 01~06. Another one of the two sets of D latch circuits 21Ag, 21Ah, 21Ai, 21Aj, 21Ak, 21Al are provided to output the respective waveform signals FIRE COLOR 01~06. Each of the waveform data signals FIRE 01~06 is inputted to a corresponding one of the D latch circuits 21Aa-21Af through one of the two input terminals, while the reference signal SEL FIRE BLACK is inputted to each of the D latch circuits 21Aa-21Af through another of the two input terminals, so that each of the D latch circuits 21Aa-21Af outputs a corresponding one of the drive waveform signals FIRE Bk 01~06 (that are to be supplied to the multiplexer 43Bk) when the two inputs thereof are both placed in their high ("1") level. Meanwhile, each of the waveform data signals FIRE 01~06 is inputted to a corresponding one of the D latch circuits 21Ag-21Al through one of the two input terminals, while the reference signal SEL FIRE COLOR is inputted to each of the D latch circuits 21Ag-21Al through another of the two input terminals, so that each of the D latch circuits 21Ag-21Al outputs a corresponding one of the drive waveform signals FIRE COLOR 01~06 (that are to be supplied to the multiplexer 43C) when the two inputs thereof are both placed in their high '1' level.

The drive circuits 21Bk, 21C have respective shift register 41Bk, 41C as serial-parallel converters for converting the serially transmitted drive data signals SIN_0, SIN_1, SIN_2 into parallel data signals corresponding to the respective actuators 2. The drive circuits 21Bk, 21C further have D flip-flops 42Bk, 42C, multiplexers 43Bk, 43C as drive-waveform-signal selectors, and drive buffers 44Bk, 44C as drive signal generators. To the respective multiplexers 43Bk, 43C, the drive waveform signal set FIRE Bk 01~06 and the drive waveform signal set FIRE COLOR 01~06 (which are retrieved from the waveform data signal set FIRE 01~06 by the waveform signal retriever 21A) are inputted. The waveform signal retriever 21A is arranged to receive the waveform data signal set FIRE 01~06 and the reference signals SEL FIRE BLACK, SEL FIRE COLOR, and to retrieve each of the drive waveform signal set FIRE Bk 01~06 and the drive waveform signal set FIRE COLOR 01~06, on the basis of or with reference of a corresponding one of the reference signals SEL FIRE BLACK, SEL FIRE COLOR. Thus, each of the drive waveform signal sets FIRE Bk 01~06, FIRE COLOR 01~06 is retrieved so as to control ejection of a corresponding one of the recording materials from a corresponding one of the recording portions.

Where the recording head unit 1 is provided by a 94 channel multi-nozzle head unit in which a total of 94 ink chambers are provided for each of the recording materials, each of the shift registers 41Bk, 41C is provided by a shift register having a bit length of 94× (the bit number of each drive data signal). The shift registers 41Bk, 41C are arranged to receive the drive data signals SIN_0, SIN_1, SIN_2 that are serially transmitted from the gate array 14. Each of the shift registers 41Bk, 41C is operated, upon a rising edge of each pulse of the clock signal CLK (i.e., upon a transition from a low voltage region to a high voltage region of the clock signal CLK), to convert each of the drive data signals SIN_0, SIN_1, SIN_2 into parallel signals S Bk_*_0~2, S C_*_0~2 ("*" represents any one of numbers 0-93) serving as activator signals for activating the actuators 2 to change volumes of the respective ink chambers. Thus, each of the activator signals S Bk_*_0~2, S C_*_0~2 is constituted by selection signal of 3 bits, so that one of six drive waveform signals is selected from among the corresponding drive waveform signal set, based on a combination of the 3 bits.

Each of the D flip-flops 42Bk, 42C is operated, upon a rising edge of each pulse of the strobe control signal STB transmitted from the gate array 14, to latch each of the activator signals S Bk_*_0~2, S C_*_0~2 parallelly transmitted thereto.

Each of the multiplexers 43Bk, 43C is operated to select one of the six drive waveform signals from among a corresponding one of the drive waveform signal sets FIRE Bk 01~06, FIRE C 01~06, based on a content represented by the 3-bit selection signal SEL Bk_*_0~2, SEL C_*_0~2 supplied from a corresponding one of the D flip-flops 42Bk, 42C, and to supply the selected drive waveform signal as a corresponding one of signals B Bk*, B C* to a corresponding one of the drive buffers 44Bk, 44C.

In the present embodiment in which each drive waveform signal set is constituted by the six drive waveform signals, the six drive waveform signals have respective waveforms that are different from each other with respect to the number of pulses, and are repeatedly inputted to a corresponding one of the multiplexers 43Bk, 43C at a constant cycle. Each of the multiplexers 43Bk, 43C selects one of the six drive waveform signals, when receiving the 3-bit selection signal SEL Bk_*_0~2, SEL C_*_0~2 included in the activator signal. Specifically described, where the 3-bit selection signal SEL_*_0~2 is low ("0") level, low ("0") level low ("0") level, a non-recording (non-printing) is selected. Where the selection signal SEL_*_0~2 is low ("0") level, high ("1") level, low ("0") level, the drive waveform signal FIRE Bk 01 or FIRE C 01 is selected. Where the selection signal SEL_*_0~2 is low ("a") level low ("0") level, high ("1") level, the drive waveform signal FIRE Bk 02 or FIRE C 02 is selected. Where the selection signal SEL_*_0~2 is high ("1") level, low ("0") level low ("0") level, the drive waveform signal FIRE Bk 03 or FIRE C 03 is selected. Thus, the ejection of the ink through each nozzle can be controlled in a total of seven levels of gradation (including a non-ejection).

Each of the driver buffers 44Bk, 44C is operated to generate, based on the drive waveform signal outputted from a corresponding one of the multiplexers 43Bk, 43C, a drive signal having a predetermined voltage (suitable for the recoding head unit 1) and a waveform corresponding to that of the outputted drive waveform signal, and then supply the generated drive signal to each actuator 2 serving for the ejection of the ink from the corresponding nozzle.

While the number of the ink chambers or nozzles provided for each of the recording materials is 94 in the present embodiment, the number may be other than 94, too. In this case, the bit length of each of the shift registers 41Bk, 41C, D flip-flops 42Bk, 42C, multiplexers (drive-waveform-signal selectors) 43Bk, 43C and driver buffers 44Bk, 44C may be adapted to be equal to a product of the number of bits of the drive data signal and the number of the ink chambers or nozzles provided for a corresponding one of the recording materials. Further, the number of the drive waveform signals of each drive waveform signal set does not necessarily have to be six, but may be other than six. In such a case, the number of bits of the drive data signal may be changed.

There will be next described the operation of the head driver unit 21.

The gate array 14 supplies the single set of waveform data signals FIRE 01~06 (containing data representative of the plurality of sets of drive waveform signals FIRE Bk 01~06, FIRE COLOR 01~06) and the plurality of reference signals SEL FIRE BLACK, SEL FIRE COLOR, to the waveform signal retriever 21A of the head driver unit 21. The waveform signal retriever 21A generates each of the drive waveform signal sets FIRE Bk 01~06, FIRE COLOR 01~06, on the basis of a state of the waveform data signal set FIRE 01~06 and a state of a corresponding one of the reference signals SEL FIRE BLACK, SEL FIRE COLOR.

Figure 5:
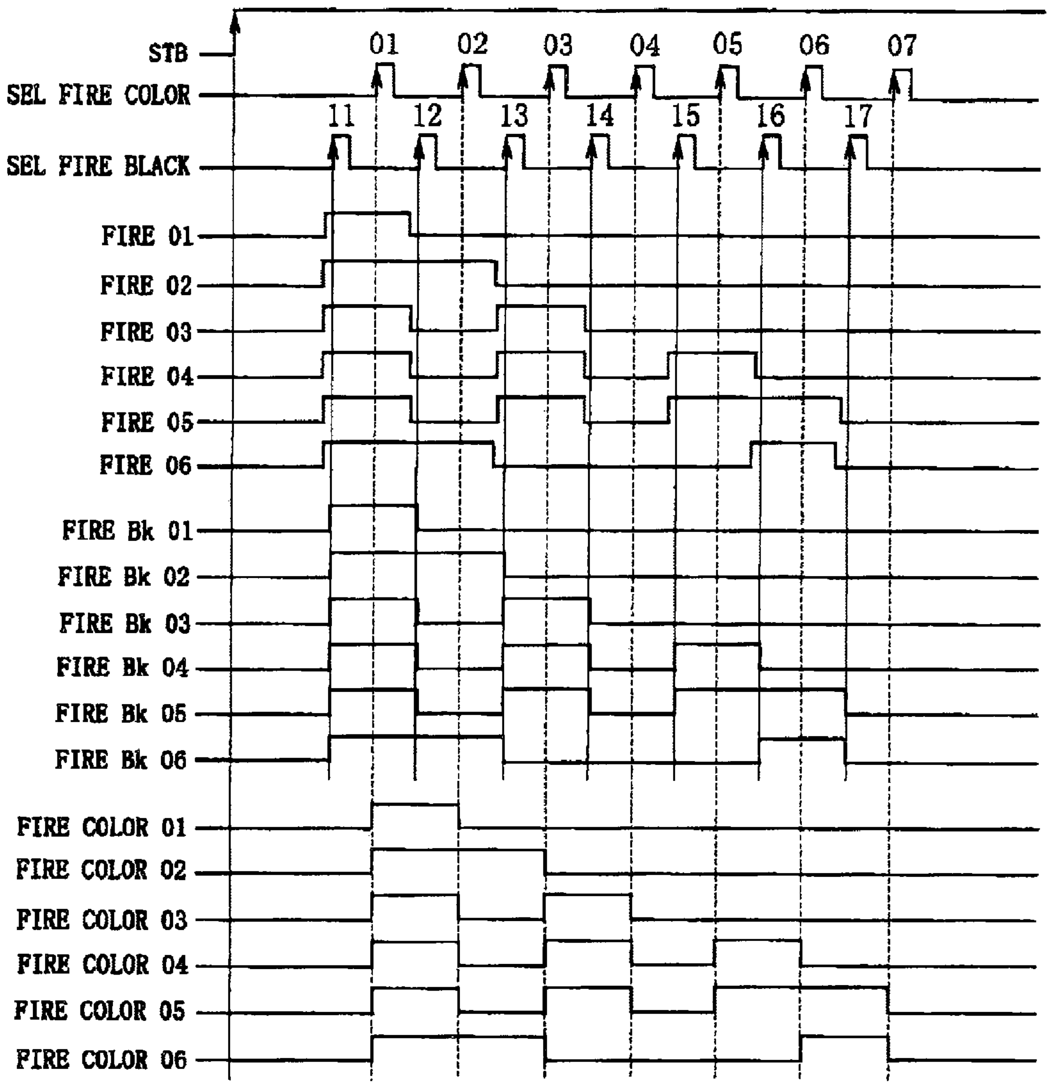
FIG. 5 is a timing chart showing an operation of the waveform signal retriever shown in FIG. 4.

Specifically described, as shown in FIG. 5, upon a rising edge of a pulse 01 of the reference signal SEL FIRE COLOR, the waveform data signals FIRE 01~06 are all in high ("1") level, so that the drive waveform signals FIRE COLOR 01~06 are all placed in high ("1") level upon the rising edge of the pulse 01, and the high level state of each of the drive waveform signals FIRE COLOR 01~06 remains unchanged until occurrence of a pulse 02 following the pulse 01. Upon a rising edge of the pulse 02, the waveform data signals FIRE 01~06 are in low ("0") level, high ("1") level, low ("0") level low ("0") level, low ("0") level high ("1") level, respectively, so that each of the drive waveform signals FIRE COLOR 01, 03, 04, 05 is placed in low ("0") level upon the rising edge of the pulse 02, while each of the drive waveform signals FIRE COLOR 02, 06 remains in high ("1") level. Upon a rising edge of a pulse 03 following the pulse 02, the waveform data signals FIRE 01~06 are in low ("0") level low ("0") level, high ("1") level, high ("1") level, high ("1") level, low ("0") level, respectively, so that the state of each of the drive waveform signals FIRE COLOR 02, 03, 04, 05, 06 is changed upon the rising edge of the pulse 03, while the state of the drive waveform signal FIRE COLOR 01 remains unchanged. The state of each of the drive waveform signals FIRE COLOR 01~06 is thus changed or remain unchanged upon occurrence of each pulse of the reference signal SEL FIRE COLOR. In this sense, the reference signal SEL FIRE COLOR can be considered to indicate rising and falling edges of the drive waveform signals FIRE COLOR 01~06.

Meanwhile, upon a rising edge of a pulse 11 of the reference signal SEL FIRE BLACK, the waveform; data signals FIRE 01~06 are all in high ("1") level, so that the drive waveform signals FIRE BLACK 01~06 are all placed in high ("1") level upon the rising edge of the pulse 11, and the high level state of each of the drive waveform signals FIRE BLACK 01~06 remains unchanged until occurrence of a pulse 12 following the pulse 11. Upon a rising edge of the pulse 12, the waveform data signals FIRE 01~06 are in low ("0") level, high ("1") level low ("0") level low ("0") level, low ("0") level, high ("1") level respectively, so that each of the drive waveform signals FIRE BLACK 01, 03, 04, 05 is placed in low ("0") level upon the rising edge of the pulse 12, while each of the drive waveform signals FIRE BLACK 02, 06 remains in high ("1") level. Upon a rising edge of a pulse 13 following the pulse 12, the waveform data signals FIRE 01~06 are in low ("0") level, low ("0") level, high ("1") level, high ("1") level, high ("1") level, low ("0") level, respectively, so that the state of each of the drive waveform signals FIRE BLACK 02, 03, 04, 05, 06 is changed upon the rising edge of the pulse 13, while the state of the drive waveform signal FIRE BLACK 01 remains unchanged. The state of each of the drive waveform signals FIRE BLACK 01~06 is thus changed or remains unchanged upon occurrence of each pulse of the reference signal SEL FIRE BLACK In this sense, the reference signal SEL FIRE BLACK can be considered to indicate rising and falling edges of the drive waveform signals FIRE BLACK 01~06.

Thus, each of the D latch circuits 21Aa-21Al of the waveform signal retriever 21A is operated to sample a state of a corresponding one of the waveform data signals FIRE 01~06 upon occurrence of each of the pulses of a corresponding one of the reference signals SEL FIRE BLACK, SEL FIRE COLOR, and to keep outputting the sampled state of the corresponding waveform data signal as a state of a corresponding one of the drive waveform signals FIRE BLACK 01~06, FIRE COLOR 01~06 until occurrence of a next one of the pulses.

The drive data signals SIN_0, SIN_1, SIN_2 are read out from the image memory 25 by the gate array 14, and are then serially transmitted to the head driver unit 21 via the flexible flat cable 22, in synchronization with the clock signal CL The thus serially transmitted drive data signals SIN_0, SIN_1, SIN_2 are inputted to the shift registers 41Bk, 41C. Each of the shift registers 41Bk, 41C has a bit length corresponding to a product of the number (e.g., 94) of the nozzles assigned for ejection of the corresponding recording material and the number of bits of the drive data signal (activator signal). Each of the shift registers 41Bk, 41C is operated, upon the rising edge of each pulse of the clock signal CLEK to convert each of the drive data signals SIN_0, SIN_1, SIN_2 into parallel signals in the form of a total of 94 drive data signals S Bk*_0~2, S C*_0~2, and to outputs the 94 drive data signals S Bk*_0~2, S C*_0~2.

Each of the D flip-flop 42Bk, 42C is operated, upon the leading edge of each pulse of the strobe control signal STB transmitted from the gate array 14 of the main circuit 10, to output the 94 drive data signals S Bk*_0~2, S C*_0~2 as 94 selection signals SEL Bk*_0~2, SEL C*_0~2 (each provided by a 3-bit signal) that are supplied to a corresponding one of the multiplexers 43Bk, 43C. The bit length of each of the D flip-flops 42Bk, 42C is equal to that of a corresponding one of the shift registers 41Bk, 41C.

Each of the multiplexers 43Bk, 43C selects one of the six drive waveform signals from among a corresponding one of the drive waveform signal sets FIRE Bk 01~06, FIRE COLOR 01~06 (that are parallelly transmitted from the waveform signal retriever 21A), for each actuator 2, based on the selection signals SEL Bk*_0~2, SEL C*_0~2. Then, the multiplexers 43Bk, 43C output the selected drive waveform signals as drive waveform signals B Bk*, B C* that are to be supplied to the drive buffers 44Bk, 44C. It is noted that each of the drive waveform signals FIRE Bk 01~06, FIRE COLOR 01~06 has at least one drive pulse.

The driver buffers 44Bk, 44C generate drive signals OUT Bk_*, OUT C_*, based on the drive waveform signals B Bk*, B C* outputted from the multiplexers 43Bk, 43C, and then supplies the generated drive signals OUT Bk_*, OUT C_* to the respective actuators 2, so that the inks are ejected through the nozzles as a result of activation of the actuators 2. Thus, the recording operation with gradation control is performed by an ink droplet ejected through each nozzle and corresponding to the waveform (e.g., the number of drive pulses and the pulse width) of the drive waveform signal that is selected based on the activator signal (selection signal SEL Bk_*_0~2, SEL C_*_0~2).

While the recording condition remains unchanged, the waveform data signals FIRE 01~06 are repeatedly read out by the gate array 14 at a constant cycle, and are repeatedly supplied as the drive waveform signals FIRE Bk 01~06, FIRE COLOR 01~06 through the waveform signal retriever 21A to the multiplexers 43Bk, 43C.

In the above-described embodiment, each of the drive waveform signals FIRE Bk 01~06, FIRE COLOR 01~06 has a length corresponding to a recording cycle. The strobe control signal STB, which is inputted to the D flip-flops 42Bk, 42C, has a cycle corresponding to the recording cycle.

Figure 6:
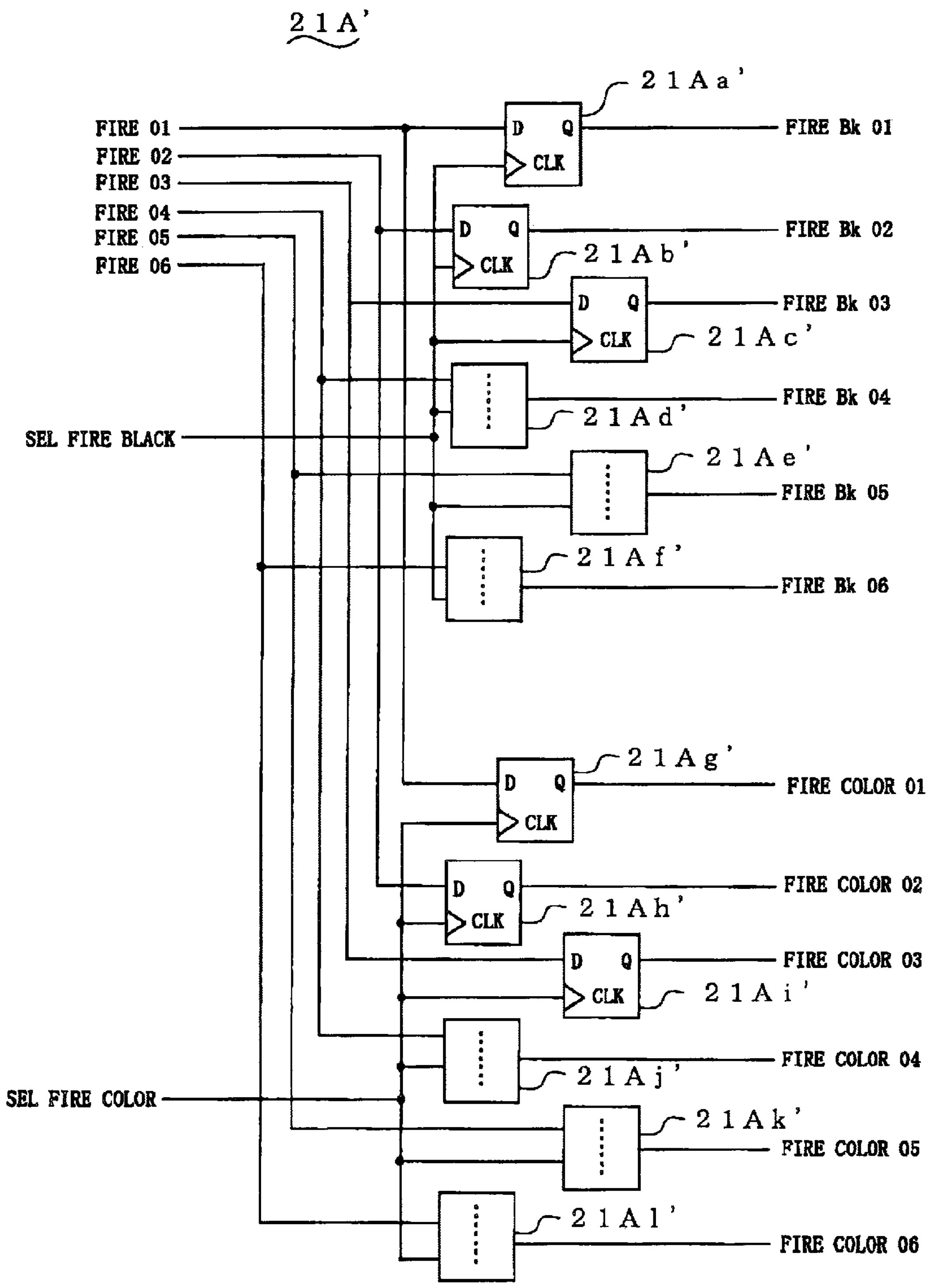
FIG. 6 is a view showing a modification of the waveform signal retriever.

In the above-described embodiment in which the D latch circuit is employed as each of the converter elements of the waveform signal retriever 21A, the state of each of the waveform data signals FIRE 01~06 is sampled while at least one of the reference signals SEL FIRE BLACK, SEL FIRE COLOR is in high level, so that the state of each of the drive waveform signals FIRE Bk 01~06, FIRE COLOR 01~06 could be changed as long as a corresponding one of the reference signals SEL FIRE BLACK, SEL FIRE COLOR is in high level. That is, if the state of any one of the waveform data signals FIRE 01~06 is influenced by noise while at least one of the reference signals SEL FIRE BLACK, SEL FIRE COLOR is in high level, such an influence of the noise against the state of the waveform data signal FIRE 01~06 could undesirably reflect upon the state of a corresponding one of the drive waveform signals FIRE Bk 01~06, FIRE COLOR 01~06. In view of this, it is possible to increase a noise resistance of the head driver unit 21, by employing a waveform signal retriever 21A', as shown in FIG. 6, in which the converter elements are provided by D flip-flops 21Aa'-21A' in place of the D latch circuits. In this modified arrangement, the state of each of the waveform data signals FIRE 01~06 is sampled only in synchronization with each rising edge of the reference signals SEL FIRE BLACK, SEL FIRE COLOR, so that the state of each of the drive waveform signals FIRE Bk 01~06, FIRE COLOR 01~06 could be changed only upon each rising edge of a corresponding one of the reference signals SEL FIRE BLACK, SEL FIRE COLOR. That is, even if the state of any one of the waveform data signals FIRE 01~06 is influenced by noise, such an influence of the noise against the state of the waveform data signal FIRE 01~06 could not reflect upon the state of each of the drive waveform signals FIRE Bk 01~06, FIRE COLOR 01~06, unless the noise influence coincides with each rising edge of a corresponding one of the reference signals SEL FIRE BLACK, SEL FIRE COLOR.

Figure 7:
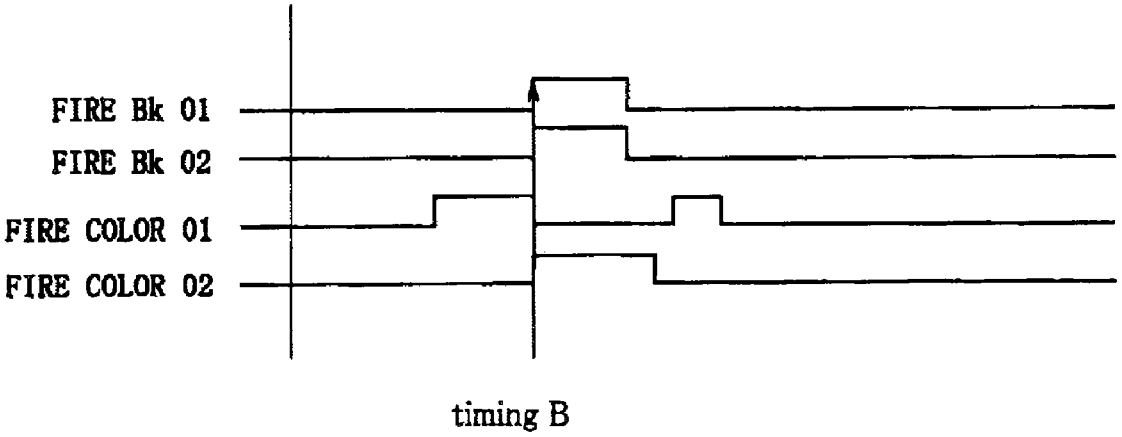
FIG. 7 is a view for explaining a stage in an operation of the signal retriever.
Figure 8:
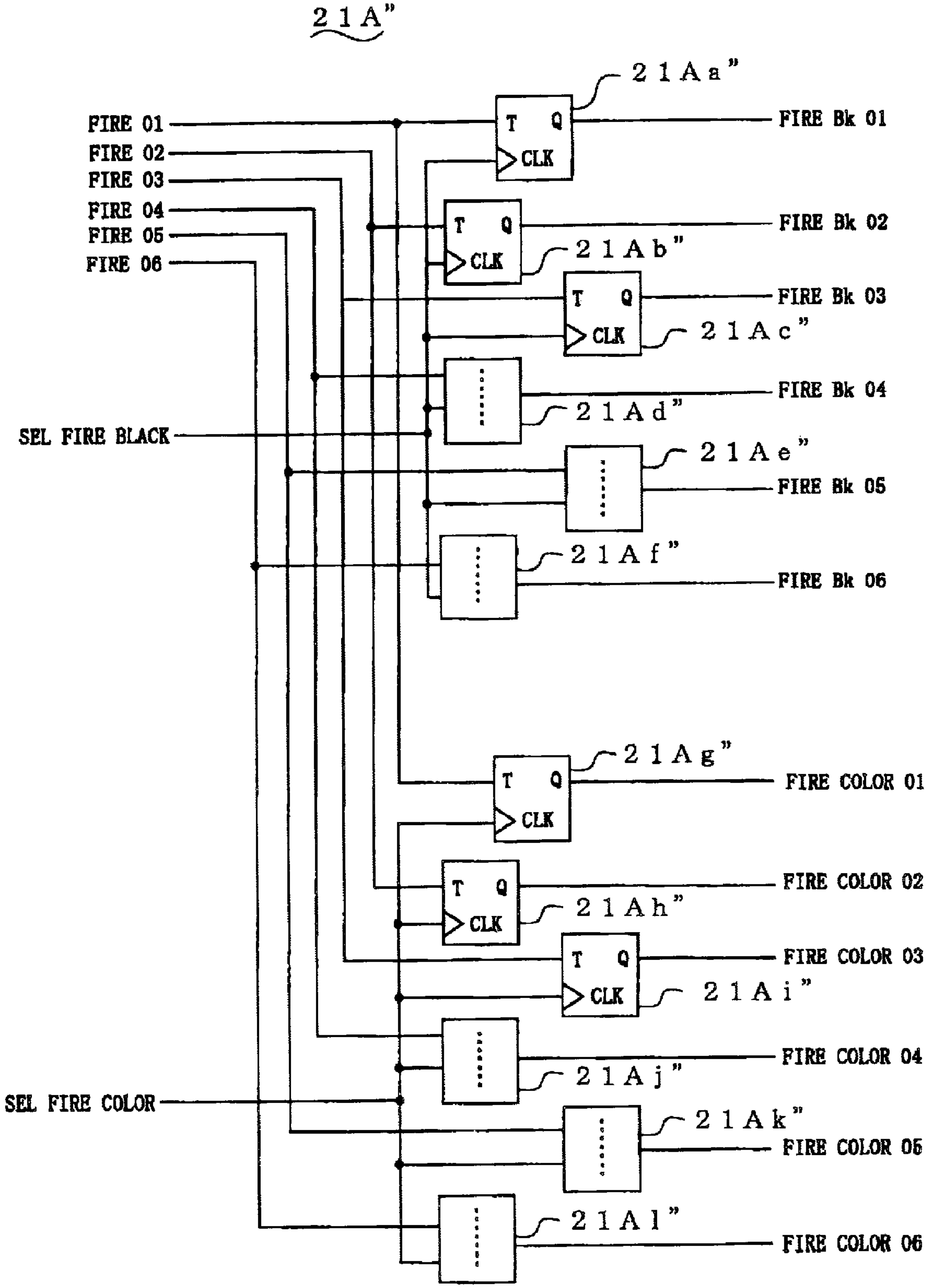
FIG. 8 is a view showing another modification of the waveform signal retriever.
Figure 9:
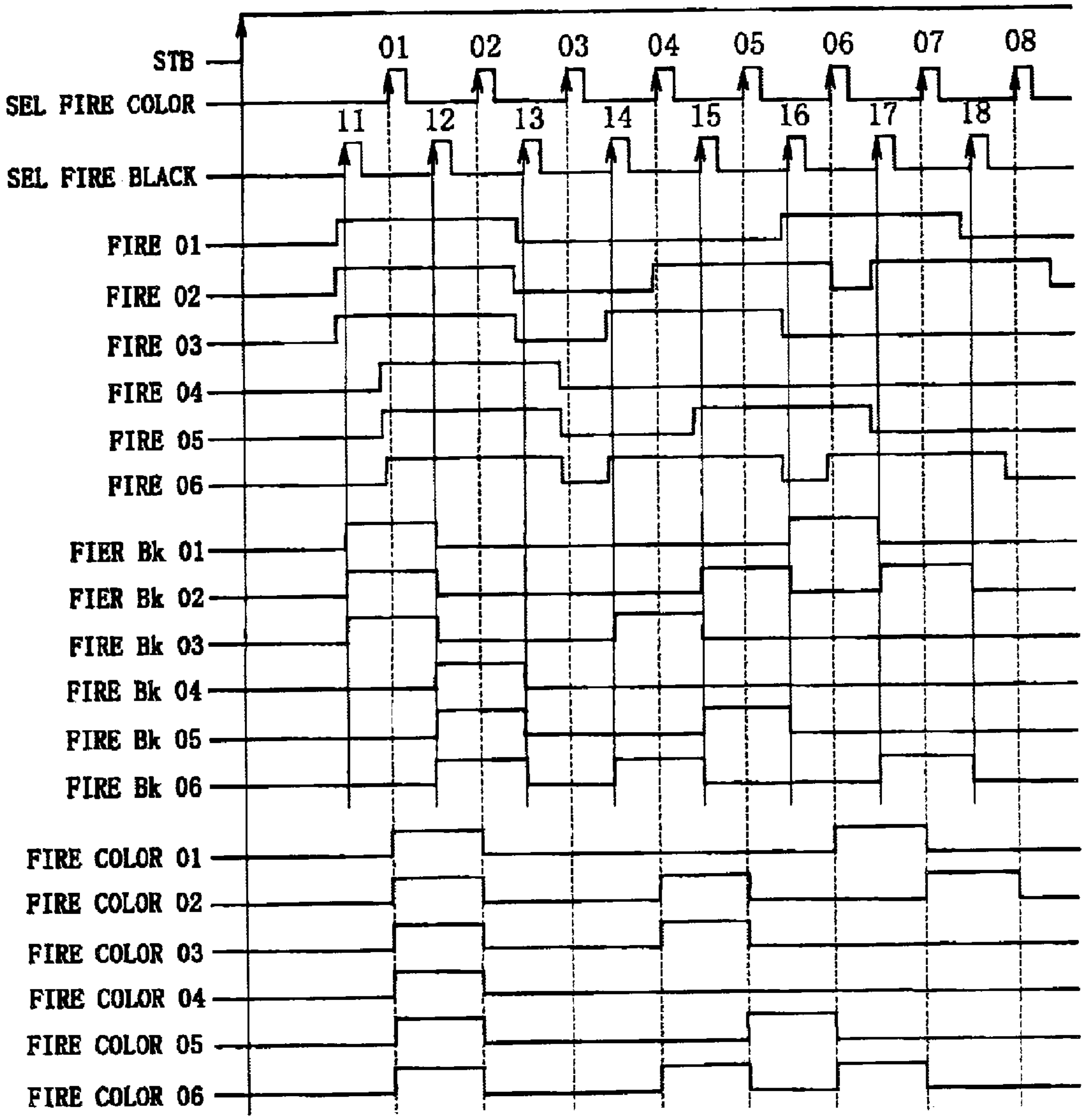
FIG. 9 is a timing chart showing an operation of the waveform signal retriever shown in FIG. 8.

In the above-described modified arrangement with the waveform signal retriever 21A' using the D flip-flops 21Aa'-21Al', it is not possible to generate drive waveform signals as shown in FIG. 7 in which, at a point of time indicated by "timing B", the drive waveform signal FIRE Bk 01 is switched from low ("0") level to high ("1") level while the drive waveform signal FIRE COLOR 01 is switched from high ("1") level to low ("0") level. If the waveform data signal FIRE 01 (from which the drive waveform signals FIRE Bk 01, FIRE COLOR 01 are both retrieved) is placed in high ("1") level at "timing B", the drive waveform signal FIRE COLOR 01 can not be placed in low ("0") level at "timing B". If the waveform data signal FIRE 01 is placed in low ("0") level at "timing B", the drive waveform signal FIRE BLACK 01 can not be placed in high ("1") level at "timing B". That is, in the arrangement with the waveform signal retriever 21A' using the D flip-flops 21Aa'-21Al', it is not possible to generate such drive waveform signals which are both retrieved from the same waveform data signal and which are concurrently changed in level inversely to each other. However, such drive waveform signals can be generated in another modified arrangement with a waveform signal retriever 21A", as shown in FIG. 8 in which the converter elements are provided by T flip-flops 21Aa"-21A". In this another modified arrangement, the above-described drive waveform signals FIRE Bk 01, FIRE COLOR 01 of FIG. 7 can be generated by simply placing the waveform data signal FIRE 01 in high ("1") level at "timing B". FIG. 9 is a timing chart showing an operation of the waveform signal retriever 21A.

In the recording apparatus of the above-described embodiment that is arranged to perform a color recording operation, the drive waveform signals supplied to the head driver unit 21 are set to be suitable for characteristics of the respective inks (recording materials). Further, the plurality of sets of drive waveform signals are supplied to the head driver unit 21, by transmission of the single set of waveform data signals into which the plurality of sets of drive waveform signals are merged. Further, while the drive waveform signals FIRE COLOR 01~06 is used for controlling ejection of the cyan ink as one of the non-black inks in the above-described embodiment, the drive waveform signals FIRE COLOR 01~06 may be used for the other of the non-black inks in addition to or in place of the cyan ink.

For changing the drive waveform signals FIRE Bk 01~06, FIRE COLOR 01~06 depending on the recording condition, the waveform data signals FIRE 01~06 may be rewritten or modified as needed, so that the modified waveform data signals FIRE 01~06 are transmitted from the host computer 26 and is stored in the RAM 12 or the image memory 25. For example, where the host computer 26 transmits a large number of image data for causing substantially concurrent ink ejection through a large number of the nozzles, the waveform data signals FIRE 01~06 may be modified such that a large number of the drive pulses of the drive signals do not overlap with each other, for reducing a peak value of electric power consumed by the recording head unit 1 and for avoiding a so-called "cross talk" between the adjacent ink chambers.

Further, it is possible to modify the waveform data signals FIRE 01~06 outputted from the gate array 14, depending on an environmental condition such as temperature.

While the recoding apparatus is of inkjet type in the above-described embodiment, the present invention is equally applicable to a recording apparatus of other type, for example, having an impact recording head or a thermal recording head.

In the above-described embodiments, each of the multiplexers 43Bk, 43C is operated to select one of the drive waveform signals from among a corresponding one of the drive waveform signal sets FIRE Bk 01~06, FIRE COLOR 01~06, based on a desired level of gradation, i.e., a desired degree of recording density (printing density) that is represented by the selection signal. However, the selection of the drive waveform signal may be made by a so-called "history control". Specifically, in the recording apparatus of impact type, the drive waveform signal selection may be made depending upon whether there is any drive data preceding or following the current drive data, so that the selection is made by taking account of vibration remaining in an impact element. In the recording apparatus of thermal type, the drive waveform signal selection may be made depending upon whether there is any drive data preceding or following the current drive data, so that the selection is made by taking account of heat remaining in a heater element.

What is claimed is:

1. A recording apparatus comprising:

a recording head unit having a plurality of actuators and operable to perform a dot recording operation using a plurality of recording materials that are ejected by activation of said actuators;

a main circuit operable to output a plurality of sets of drive waveform signals for controlling ejection of the recording materials, each of said plurality of sets including a plurality of drive waveform signals having respective waveforms different from each other; and a head driver unit operable to receive said plurality of sets of drive waveform signals outputted from said main circuit, generate a drive signal based on one of said drive waveform signals that is selected from among one of the received sets of drive waveform signals, and supply the generated drive signal to each of said plurality of actuators, wherein said main circuit supplies said plurality of sets of drive waveform signals to said head driver unit, by transmitting a single set of waveform data signals containing data representative of said plurality of sets of drive waveform signals, to said head driver unit, such that the single set of waveform data signals includes a set of merged signals into each of which at least two drive waveform signals including a corresponding one of the drive waveform signals of one of said plurality of sets of drive waveform signals and a corresponding one of the drive waveform signals of another of said plurality of sets of drive waveform signals are merged, wherein said main circuit transmits, in addition to said single set of waveform data signals, a plurality of reference signals to said head driver unit, and wherein said head driver unit includes a waveform signal retriever operable to retrieve said plurality of sets of drive waveform signals from said single set of waveform data signals, with reference to said reference signals, so that said head driver unit receives said plurality of sets of drive waveform signals.

2. The recording apparatus according to claim 1, wherein said main circuit is operable to output, in addition to said plurality of sets of drive waveform signals, activator signals for activating said actuators, and wherein said head driver unit is operable to receive said activator signals in addition to said plurality of sets of drive waveform signals.

3. The recording apparatus according to claim 1, wherein said waveform signal retriever is operable to retrieve each of said plurality of sets of drive waveform signals from said single set of waveform data signals, with reference to a corresponding one of said reference signals.

4. The recording apparatus according to claim 3, wherein the number of the retrieved sets of drive waveform signals is equal to the number of said reference signals.

5. The recording apparatus according to claim 2, wherein each of said activator signals outputted from said main circuit and received by said head driver unit contains a selection data, and wherein said head driver unit includes a drive-waveform-signal selector operable to select one of said drive waveform signals from among each of said plurality of sets of drive waveform signals, based on said selection data, and to generate said drive signal having a waveform corresponding to the waveform of the selected one of said drive waveform signals.

6. The recording apparatus according to claim 1, wherein said recording head unit includes a plurality of recording portions each of which is operable to perform the dot recording operation using a corresponding one of the recording materials that is ejected by activation of the actuators of said each of said recording portions, and wherein each of said plurality of sets of drive waveform signals is retrieved from said single set of waveform data signals by said waveform signal retriever, with reference to a corresponding one of said reference signals, so as to control ejection of a corresponding one of the recording materials from a corresponding one of said recording portions.

7. The recording apparatus according to claim 1, wherein each of said plurality of sets of drive waveform signals is retrieved from said single set of waveform data signals by said waveform signal retriever, with reference to a corresponding one of said reference signals each of which is represented by a series of pulses, wherein said waveform signal retriever includes a plurality of converter element sets each of which includes a plurality of converter elements operable to output the respective drive waveform signals of a corresponding one of said sets of drive waveform signals, wherein each of said converter elements is operable to receive a corresponding one of said reference signals and a corresponding one of waveform data signals of said single set of waveform data signals, and to output a corresponding one of said drive waveform signals of the corresponding set of drive waveform signals, and wherein said each of said converter elements samples a state of the received waveform data signal upon occurrence of each of the pulses of the received reference signal, and keeps outputting the sampled state of said received waveform data signal as a state of the corresponding drive waveform signal until occurrence of one of the pulses following said each of the pulses.

8. The recording apparatus according to claim 7, wherein each of said converter elements includes a D latch circuit.

9. The recording apparatus according to claim 7, wherein each of said converter elements includes a D flip-flop.

10. The recording apparatus according to claim 7, wherein each of said converter elements includes a T flip-flop.

11. The recording apparatus according to claim 1, wherein each of said plurality of sets of drive waveform signals is retrieved from said single set of waveform data signals by said waveform signal retriever, with reference to a corresponding one of said reference signals each of which is represented by a series of pulses, and wherein the corresponding reference signal indicates rising and falling edges of said drive waveform signals of said each of said plurality of sets of drive waveform signals.

12. The recording apparatus according to claim 1, further comprising:

a stationary main body in which said main circuit is fixedly disposed;

a carriage movable relative to said stationary main body, and carrying said recording head unit and said head driver unit; and a flexible cable connecting said main circuit and said driver unit, and transmitting said single set of waveform data signals and plurality of reference signals from said main circuit to said head driver unit.

13. The recording apparatus according to claim 1, wherein said recording head unit has a plurality of ink chambers each of which stores therein an ink as one of the recording materials, and wherein each of said actuators is activated by said drive signal, so as to change a volume of a corresponding one of said ink chambers, for ejecting the ink in the form of an ink droplet.

* * * * *